United States Patent [19]

Mazzagatti et al.

[11] Patent Number: 4,692,706
[45] Date of Patent: Sep. 8, 1987

[54] WELL LOGGING MEANS AND METHOD FOR DETERMINING WATER SATURATION OF A PETROLEUM RESERVOIR HAVING TWO TRANSMITTERS AND TWO RECEIVERS

[75] Inventors: Roy P. Mazzagatti, Bellaire; Donald J. Dowling, Houston, both of Tex.

[73] Assignee: Texaco Inc, White Plains, N.Y.

[21] Appl. No.: 706,376

[22] Filed: Feb. 27, 1985

[51] Int. Cl.$^4$ .............................................. G01V 3/30
[52] U.S. Cl. ................................... 324/338; 324/344; 324/334; 324/333
[58] Field of Search .............................. 324/338–343, 324/332–335, 344

[56] References Cited

U.S. PATENT DOCUMENTS

| | | | |
|---|---|---|---|
| 3,993,944 | 11/1976 | Meador et al. | 324/339 X |
| 4,009,434 | 2/1977 | McKinlay et al. | 324/339 X |
| 4,100,483 | 7/1978 | Thompson et al. | 324/341 |
| 4,130,793 | 12/1978 | Bridges et al. | 324/341 |
| 4,319,192 | 3/1982 | Chemali et al. | 324/339 X |
| 4,359,687 | 11/1982 | Vinegar et al. | 324/366 |
| 4,398,151 | 8/1983 | Vinegar et al. | 324/366 |
| 4,401,947 | 8/1983 | Cox | 324/338 |
| 4,451,789 | 5/1984 | Meador | 324/335 X |
| 4,467,642 | 8/1984 | Givens | 324/366 X |
| 4,472,684 | 9/1984 | Schuster | 324/339 |

OTHER PUBLICATIONS

Grubb et al, "Borehole Measurements of Conductivity and Dielectric Constant in the 300 kHz to 25 MHz Frequency Range", *Radio Science*, vol. 11, No. 4, Apr. 1976, pp. 275–283.

Primary Examiner—Reinhard J. Eisenzopf
Assistant Examiner—Warren S. Edmonds
Attorney, Agent, or Firm—Robert A. Kulason; James J. O'Loughlin; Ronald G. Gillespie

[57] ABSTRACT

Method and apparatus determining the water saturation of a petroleum reservoir earth formation include transmitting electromagnetic energy in the earth formation from within a borehole traversing the earth formation and at least two frequencies within a preferred range of frequencies. The electromagnetic energy is received at two locations from the earth formation and within the borehole. The water saturation of the earth formation is derived from the received electromagnetic energy.

10 Claims, 5 Drawing Figures

WELL LOGGING MEANS AND METHOD FOR DETERMINING WATER SATURATION OF A PETROLEUM RESERVOIR HAVING TWO TRANSMITTERS AND TWO RECEIVERS

BACKGROUND OF THE INVENTION

Field of the Invention

The present invention relates to well logging in general, and more particlarly, to electric well logging.

SUMMARY OF THE INVENTION

Method and apparatus determining the water saturation of a petroleum reservoir earth formation include transmitting electromagnetic energy in the earth formation from within a borehole traversing the earth formation and at least two frequencies within a preferred range of frequencies. The electromagnetic energy is received at two locations from the earth formation and within the borehole. The water saturation of the earth formation is derived from the received electromagnetic energy.

The foregoing and other objects and advantages of the invention will appear more fully hereinafter from the consideration of the detailed description which follows, taken together with the accompanying drawings wherein two emodiments of the present invention are illustrated by way of example. It is to be expressly understood, however, that the drawings are for illustration purposes only and are not to be construed as defining the limits of the invention.

DESCRIPTION OF THE PREFERRED EMBODIMENT

Heretofore in the application of the state of art of commercial electric logs, where the salinity of the reservoir formation water is known, the electric log can be used to accurately determine water saturaion. However, where the salinity is unknown then the electric log fails as a tool for this task.

In recent years, secondary oil recovery procedures have become more extensively used. These procedures usually require flooding of subsurface formations with various waters which result in mixtures of formation waters and flood waters having variable and unknown salinities. This renders the conventional induction electric log of questionable value in determination of formation oil-water content. Accordingly, it is desirable to provide a method for the accurate measurement of the formation oil-water content in the presence of the above described condition. The applicants have discovered that measurements of electroconductivity or resistivity of reservoir rocks containing oil and water mixtures are significantly frequency dependent within certain selected frequency ranges which are above the measurement frequency of conventional induction logging equipment.

The present invention proposes a logging method whereby earth formations electrical resistivity measurements are made at various frequencies. One variation, for example, is to make a first electrical resistivity measurement at 100 megahertz. A second measurement may then be made at 0.5 megahertz. Then the resistivity values at these frequencies are compared. For example, a ratio of these two resistivity values may be computed using 100 megahertz values as the reference values.

Figure 1:
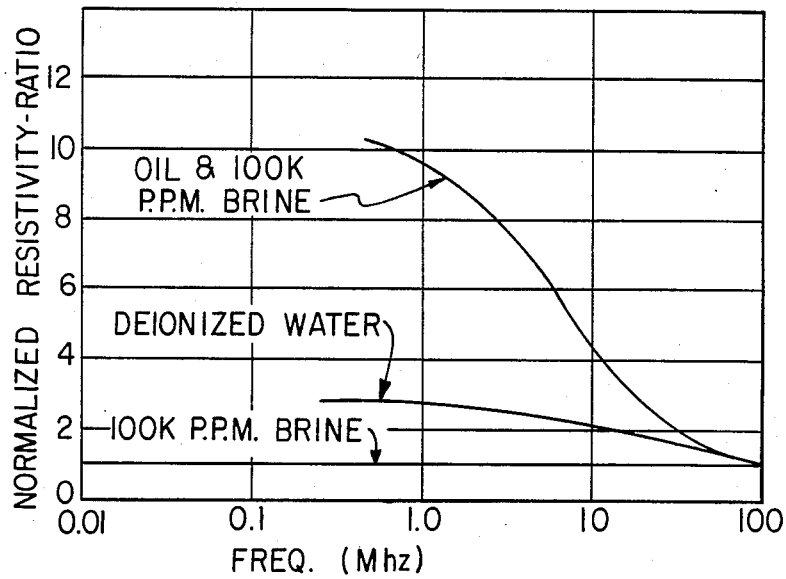
FIG. 1 is a graph depicting the effect of brine, deionized water and a combination of oil and brine on the resistivity of an earth formation versus frequency.

FIG. 1 shows this change in the formation resistivity based on frequency. One hundred thousand parts per million brine in the formation yields as a straight horizontal line having a normalized resistivity value of 1. Deionized water in the formation yields a line that remains relatively constant through the lower frequency portion of the figure, that if from 0.01 through just slightly less than 1.0 megahertz and thereafter dropping off at a gradual rate to unity at approximately 100 megahertz. On the other hand, oil and 100,000 parts per million brine in the formation, shows that the formation at a frequency at 0.5 megahertz has a normalized resistivity value of slightly greater than 10 which drops in value drastically until the normalized resistivity value approaches unity at 100 megahertz.

A simple two frequency measurement would dramatically aid in the discovery of oil and water. Further if a greater number of frequencies are used with greater accuracy and confidence can the determination of water saturation be made.

The easiest way to practice the invention, although it may not be the most practical way in the field, is to run a conventional resistivity well logging sonde twice in the borehole operating at two different frequencies from a preferred range of frequencies. Such a preferred range of frequencies is 1 MHz to 60 MHz, although the present invention is operable within a range of frequencies 0.01 MHz to 100 MHz.

Figure 2:
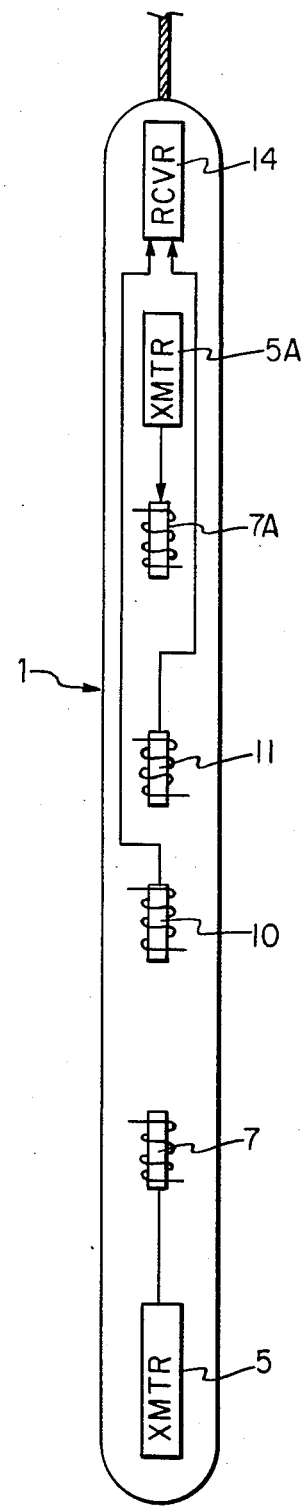
FIG. 2 is a simplified block diagram and partial block diagram and partial schematic of a well logging sonde constructed in accordance with the present invention.
Figure 3:
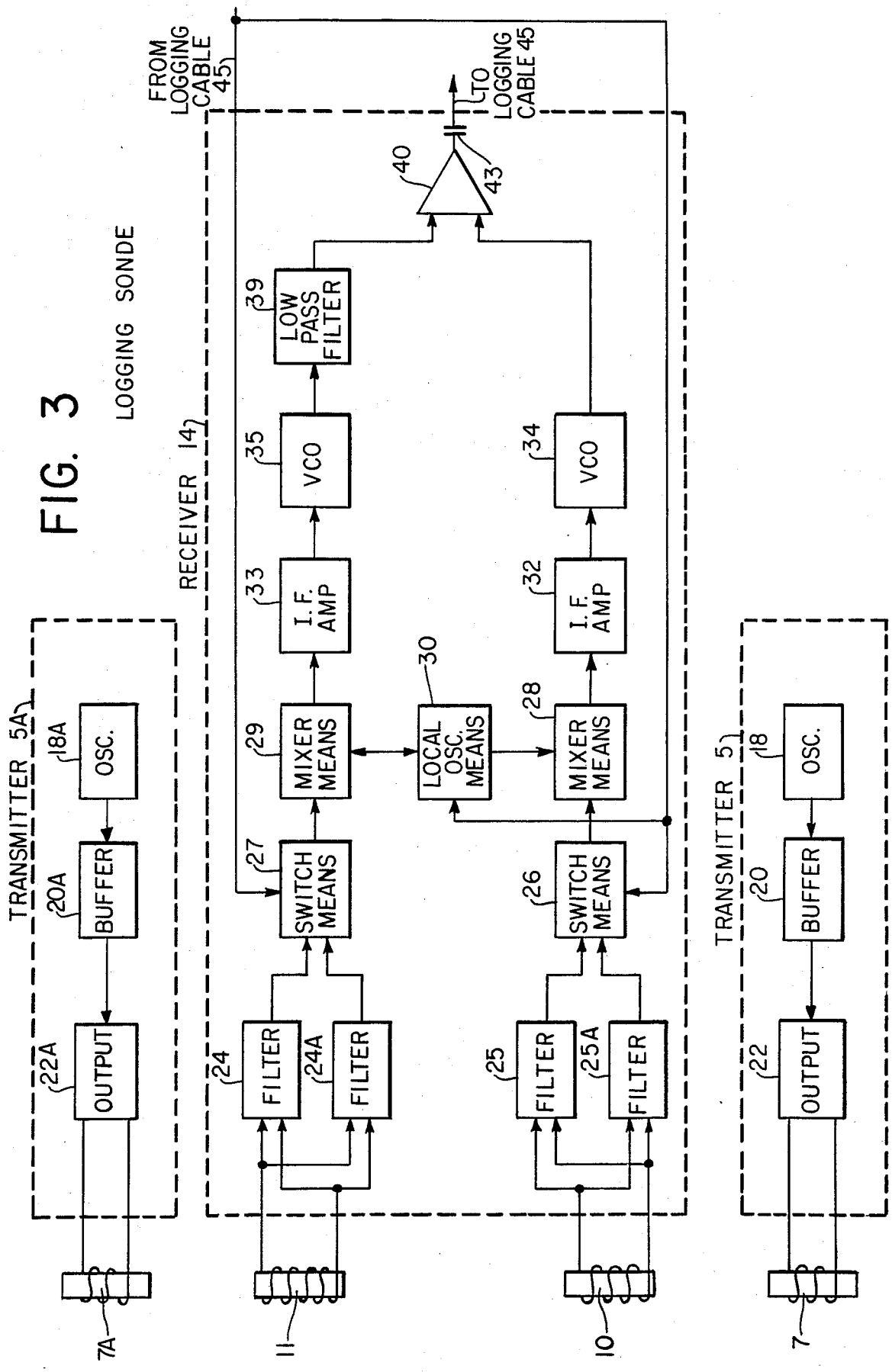
FIG. 3 is a detailed block diagram of the transmitters and receivers shown in FIG. 2.
Figure 4:
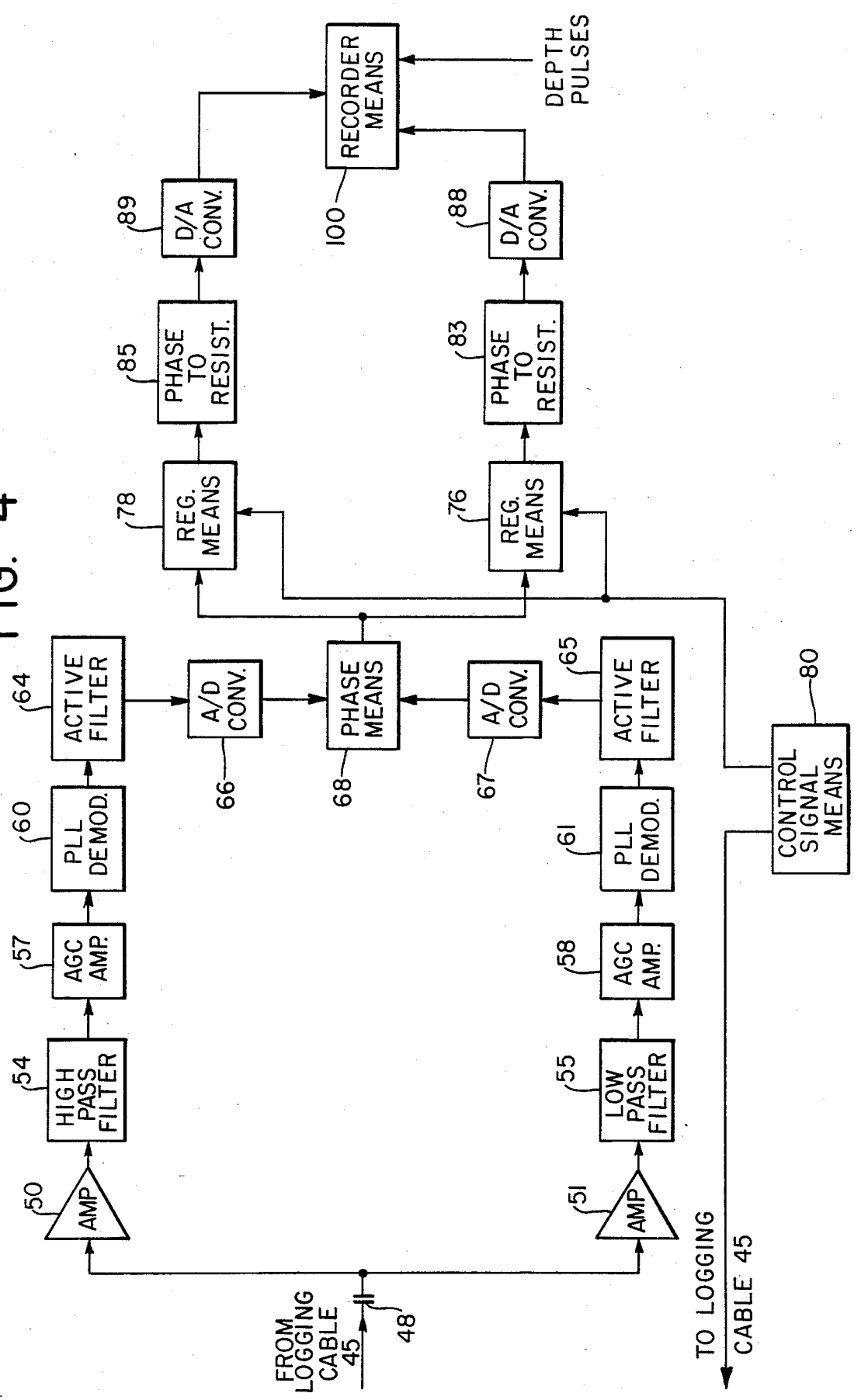
FIG. 4 is a detailed block diagram of the surface electronics used in accordance with the present invention.

Another embodiment is shown in FIGS. 2, 3, and 4 where a logging sonde 1 includes a transmitter 5 provides an alternating current signal at a first predetermined frequency of a preferred range of frequencies. this transmitter 5 may provide the signal at 20 megahertz to a transmitter coil 7. Transmitter coil 7 transmits electrical energy into the earth formation. Receiver coils 10 and 11 are spaced 25 and 37 inches, respectively, from transmitter coil 7. Receiver coils 10 and 11 receive electrical energy that has passed through the earth's formation and provides corresponding alternating current signals to a receiver 14. Sonde 1 also includes another transmitter 5A which provides a signal at a second predetermined frequency from the preferred range, such as 2 megahertz, to another transmitter coil 7A. Elements having the same numeric identification with different alpha suffixes operate in a similar manner. The second predetermined frequency may be 2 MHz.

Referring now to FIG. 3, transmitter 5 includes an oscillator 18 providing a signal to a buffer amplifier 20 which in turn provides the signal to a power output amplifier shown as output 22. A typical power output would be in the order of 2 watts. The 20 MHz signal emitted by coil 7 causes an electromagnetic field to propagate through the surrounding formation and this field is detected sequentially by receiver coils 10 and 11.

The time lag or phase angle between the two signals detected at coils 10 and 11 is inversely proportional to the resistivity of the surrounding formation. Similarly, transmitter 7A includes oscillator 18A, buffer 20A and output 22A.

Coils 10, 11 provide signals to filters 24, 24A and 25, 25A respectively. Filters 24 and 25 are designed to pass a 2 MHz signal while blocking the 20 MHz signal. Filters 24A and 25A do the opposite, they block the 2 MHz signal and pass the 20 MHz signal. The passed signals from filters 24, 24A are provided as input to a single pole, double throw electronic switch means 26. Similarly passed signals from filters 25, 25A are provided to another single pole, double throw electronic switch means 27. Switch means 26 and 27 are responsive to a control signal from a logging cable 45, as hereinafter explained, to pass either the received 2 MHz signals or the received 20 MHz signals. The passed signals from switch means 26, 27 are provided to mixer means 28 and 29, respectively, which also receives signals from local oscillator means 30 having predetermined frequencies of about 1.998 megahertz and 19.998 megahertz as determined by the control signal from logging cable 45. Mixer means 28, 29 provide IF signals at a predetermined frequency, preferably about 2 kilohertz, to IF amplifiers 32 and 33, respectively, which, in turn provide IF signals to voltage controlled oscillators 34 and 35, respectively. Oscillator 34 provides an FM carrier frequency of 72 kilohertz, while oscillator 35 provides an FM carrier frequency of 26 kilohertz. The resulting signal from oscillator 35 is provided to a low pass filter 39 which in turn provides a signal to a cable driver 40 which also receives a resulting signal from oscillator 34. Cable driver 40 provides an output signal to a capacitor 43 to well logging cable 45 for transmission to the surface for further processing.

With reference to FIG. 4, at the earth surface, the signal from cable 45 passes through a DC blocking capacitor 48 and is communicated to amplifiers 50, 51. Amplifiers 50, 51 provide amplified signals to a high pass filter 54 and to a low pass filter 55, respectively. Filters 54, 55 provide signals to automatic gain control amplifiers 57 and 58, respectively, which in turn provide amplifier signals to phase lock loop demodulators 60 and 61, respectively. The outputs from demodulators 60, 61 are provided to active filters 64 and 65, respectively. Filters 64, 65 provide the signals corresponding in frequency to the original 2 MHz or 20 MHz signals provided by mixer means 29 and 28, respectively.

The signals from active filters 64 and 65 are provided to analog-to-digital converters 66 and 67 respectively which converts them to digital signals. The digital signals from analog-to-digital converters 66 and 67 are provided to a phase means 68 which determines the phase difference between the signals and provides digital signals representative of the difference to register means 76 and 78. Phase means 68 is the type which permits input signals to be applied at either port thereby accommodating the differences in the "near" and "far" receiver coils when the alternate transmitter sources of the electromagnetic energy are considered. It should then be remembered that this difference signal at different points in time are going to be representative of the difference between the received 2 MHz signals and at other times the difference between the received 20 MHz signals. Registers 76 and 78 receive a control signal from control signal means 80 which is related to the control signal provided by 80 to switch means 26 and 27 so that register means 76 or 78 will enter the digital signals from phase means 68. Thus register means 78 will store the digital signals representative of the difference between the received 2 MHz signals while register means 78 will store the digital signals representative of the difference between the received 20 MHz signals. Register means 76 and 78 provides digital outputs to phase to resistivity converters 83 and 85 respectively. Phase to resistivity converters 83 and 85 are EPROM memories, containing stored resistivity values associated with different phase measurements. Phase to resistivity converters 83 and 85 provides digital signals corresponding to the resistivity measurements for the two frequencies are provided to digital-to-analog converters 88 and 89 respectively which converts them to analog signals and provides them to recorder means 100 which also depth pulses provided to it in a conventional manner for correlating the resistivity measurements to depth in the borehole.

If a ratio of the two resistivity measurements is desired the signals from digital-to-analog converters 88 and 89 may be provided to a divider which in turn would provide a ratio signal to recorder means 100.

Figure 5:
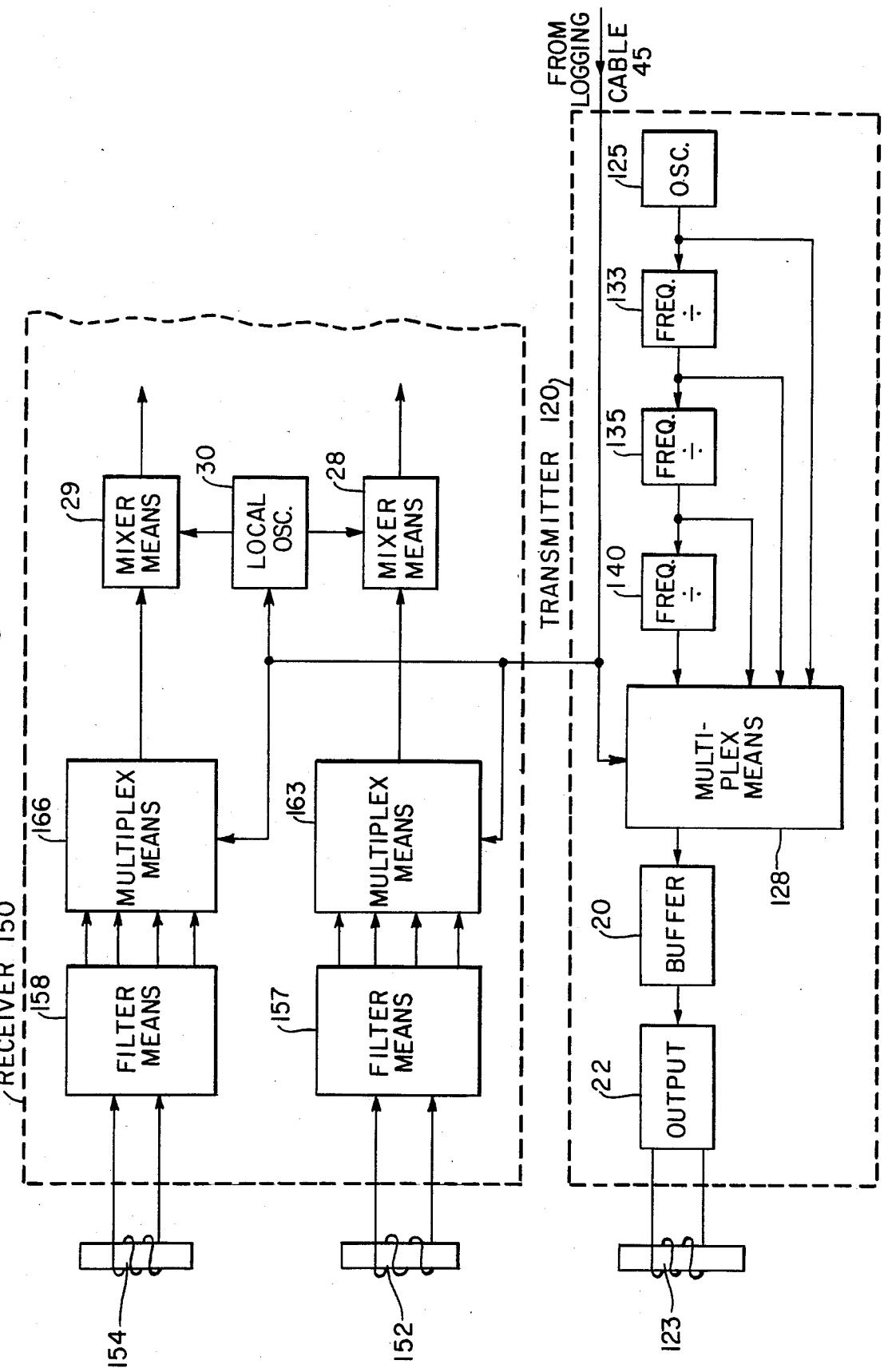
FIG. 5 is a partial detailed block diagram of another embodiment of the present invention.

With reference to FIG. 5 there is shown another embodiment of the present invention wherein more than two frequencies are transmitted into and received from the earth formation. Logging sonde 1 contains only one transmitter 120 and one transmitter coil 123. Transmitter 120 includes an oscillator 125 providing a signal at the highest frequency of the multiple frequencies to multiplex means 128 and to a frequency divider 133. Frequency divider provides a signal at a lesser frequency to multiplex means 128 and to another frequency divider 135. Frequency divider 135 provides a signal at a frequency less than that of the signal from frequency divider 133 to multiplex means 128 and to yet another frequency divider 140. Frequency divider 140 provides a signal having the lowest frequency of the multiplex frequencies to multiplex means 128. Multiplex means 128 is controlled by a signal from control signal means 80 on the surface by way of logging cable 45 to provide the signals of different frequencies to buffer 20 in a predetermined manner. Buffer 20 as hereinbefore mentioned provides its signal to output 22 which in turn energizes transmitter coil 123.

Well logging sonde 1 also includes a receiver 150 which is very similar to receiver 14 except as modified as hereinafter explained. Logging sonde 1 has receiver coils 152 and 153 which provide signals representative of received electromagnetic energy from the earth formation to filter means 157 and 158, respectively. Filter means 157, 158 filters the signals from receiver coils 152 and 154, respectively for the same frequencies as the signals provided to multiplexer means 128. Thus filter means 157, 158 each provide four signals having the same frequencies as provided by oscillator 125 and frequencies dividers 133, 135 and 140. Multiplexing means 163 and 166 is controlled by the control signal from logging cable 45 to multiplex signals from filter means 157 and 158 so that the signals provided by multiplex means 163 and 166 have the same frequency as the signal being transmitted by transmitter coil 123. The signals from multiplexing means 163, 166 are provided to mixer means 28 and 29, respectively receiving signals from a local oscillator means 30 as hereinbefore explained. The operation of reciever 150 is then the same as heretofore disclosed for the operation of receiver 14 in re the processing of the signals from mixer means 28 and 29. Although not shown, it is obvious to one skilled in the art that, with reference to FIG. 4, since we have four frequencies involved we will now require four register means of the same type as registers 76, 78. Similarly we will require four phase to resistivity converters of the same type as converters 83 and 85. Also needed but not shown are four D to A converters of the type represented by D to A converter 88. All this is not shown in the drawing since it is fairly simple to follow and would be obvious to one skilled in the art to practice this particular embodiment.

What is claimed is:

1. A well logging system for determining the water saturation of a petroleum reservoir earth formation comprising:
   a well logging sonde which includes:
   first transmitter means for transmitting electromagnetic energy into the earth formation at a first frequency selected from a range of frequencies from 0.01 MHz to 100 MHz,
   second transmitter means for transmitting electromagnetic energy into the earth formation at a second frequency selected from the range of frequencies,
   first receiving means spaced predetermined distances from said first and second transmitter means for receiving the transmitted electromagnetic energies from the earth formation and providing a signal corresponding thereto,
   second receiving means spaced predetermined distances from the first and second transmitting means for receiving the transmitted electromagnetic energies from the earth formation and providing a signal corresponding thereto, and
   processing means for processing the signals provided by both receiving means to provide an output signal related to the received electromagnetic energies;
   well logging cable means for conducting the output signal from the well logging sonde to the surface; and
   means at the surface receiving the output signal provided by the well logging cable means for deriving the water saturation of the petroleum reservoir earth formation in accordance with the received electromagnetic energies.

2. A well logging system as described in claim 1 in which the deriving means includes:
   means for providing a control signal to the well logging cable means for conduction downhole;
   each receiver means is a receiver coil;
   the processing means includes:
   a pair of filter means connected to each reciever coil for separating the signals provided by the receiver coils according to frequency,
   a pair of switching means, each switching means being connected to a corresponding filter means and to the well logging cable means for being controlled by the control signal to selectively pass one or the other signal from the filter means,
   local oscillator means for providing a pair of signals having different frequencies,
   a pair of mixer means, each mixer means being connected to a corresponding switching means and to the local oscillator means for mixing the signal passed by the switching means with a corresponding signal from the local oscillator means,
   a pair of IF amplifier means, each IF amplifier means being connected to a corresponding mixer means for amplifier the signal provided by the mixer means,
   a pair of voltage controlled oscillator means, each voltage controlled oscillator means being connected to a corresponding IF amplifier means for providing a signal whose frequency is a function of the amplitude of a signal provided by the IF amplifier means,
   low pass filter means connected to one of the voltage controlled oscillator means,
   a differential amplifier means connected to the low pass filter means and to the voltage controlled oscillator means not connected to the low pass filter means for providing the output signal to the well logging cable means in accordance with signals provided by the last mentioned voltage controlled oscillator means and by the low pass filter means.

3. A well logging system as described in claim 2 in which each transmitter means includes:
   a transmitter coil,
   an oscillator providing a signal at the selected frequency,
   buffer means connected to the oscillator for amplifying the provided signal by the oscillator, and
   energizing means connected to the transmitter coil and to the buffer means for energizing said transmitter coil to transmit electromagnetic energy into the earth formation in accordance with the amplified signal from the buffer means.

4. A well logging system as described in claim 3 in which the deriving means includes:
   a pair of amplifying means connected to the well logging cable means for amplifying the output signal from the well logging cable means,
   high pass filter means connected to one amplifying means for passing a high frequency signal from the one amplifier means,
   low pass filter means connected to the other amplifier means for passing a low frequency signal from the other amplifying means,
   a pair of automatic gain control amplifier means, one automatic gain control amplifier means being connected to the high pass filter means while the other automatic gain control amplifier means is connected to the low pass filter means, for amplifying the signals from the high and low pass filter means,
   a pair of phase lock loop demodulator means, each phase lock loop demodulator means being connected to a corresponding automatic gain control amplifier means for providing a signal at a locked-in frequency,
   phase means connected to both phase lock loop demodulator means for providing a signal related to the phase difference between the electromagnetic energy received by the two receiver coils,
   a pair of register means connected to the phase means and to the control signal means for storing the phase difference signal in accordance with the control signal from the control signal means and for providing signals corresponding to the stored phase signals,
   a pair of phase-to-resistivity converter means, each phase-to-resistivity converter means being connected to a corresponding register means for converting the stored phase difference signal to a resistivity signal, and means for providing an indication of the water saturation of the petroleum reservoir earth formation in accordance with the resistivity signals.

5. A system as described in claim 1 in which the first and second transmitter means transmits electromagnetic energy into the earth formation at frequencies within a preferred range of frequencies from 1 MHz to 100 MHz.

6. A well logging system for determining the water saturation of a petroleum reservoir earth formation comprising:

a well logging sonde which includes:

transmitter means for transmsitting electromagnetic energy into the earth formation, transmitter control means responsive to a control signal for changing the frequency of the electromagnetic energy being transmitted into the earth formation in response to a control signal so as to time sequentially transmit electromagnetic energy at at least three frequencies selected from a range of frequencies from 0.01 MHz to 100 MHz, first receiving means spaced a predetermined distance from said transmitter means for receiving the electromagnetic energy from the earth formation and providing a signal corresponding thereto, second receiving means spaced a predetermined distance from the transmitter means for receiving electromagnetic energy from the earth formation and providing a signal corresponding thereto, processing means for processing the signals provided by both receiving means to provide an output signal related to the received electromagnetic energies;

well logging cable means for conducting the output signal from the well logging sonde to the surface; and means at the surface for deriving the water saturation of the petroleum reservoir earth formation in accordance with the output signal provided by the well logging cable means, and for providing a control signal by way of the well logging cable means to the transmitter control means.

7. A well logging system as described in claim 6 in which each receiver means is a reciever coil; and the processing means includes:

filter means, each filter means being connected to a corresponding receiver coil for separating the signals provided by the receiver coils according to frequency, multiplexing means connected to the filter means and responsive to the control signal for multiplexing the signals provided by the filter means to provide two signals representative of electromagnetic energy of the same frequency received by the receiver coils, local oscillator means for providing a pair of signals having different frequencies, a pair of mixer means, each mixer means being connected to a corresponding multiplexing means and to the local oscillator means for mixing the signals passed by the switching means with a corresponding signal from the local oscillator means, a pair of IF amplifier means, each IF amplifier means being connected to a corresponding mixer means for amplifying the signal provided by the mixer means, a pair of voltage control oscillator means, each voltage control oscillator means being connected to a corresponding IF amplifier means for providing a signal whose frequency is a function of the amplitude of a signal provided by the IF amplifier means, low pass filter means connected to one of the voltage controlled oscillator means, a differential amplifier connected to the low pass filter means and to the voltage controlled oscillator means not connected to the low pass filter means for providing the output signal to the well logging cable means in accordance with signals provided by the last mentioned voltage controlled oscillator means and by the low pass filter means.

8. A well logging system as described in claim 7 in which the transmitter means includes:

a transmitter coil, an oscillator providing a signal at a selected frequency, a plurality of frequency dividers connected in the manner to the oscillator so as to provide a plurality of signals at different frequencies all of which are within the preferred range of frequencies, buffer means for amplifying a signal, and energizing means connected to the transmitter coil and to the buffer means for energizing said transmitter coil to transmit electromagnetic energy into the earth formation in accordance with the amplified signal from the buffer means; and multiplexing means connected to the control signal means and to the oscillator and the frequency dividers and to the buffer means for multiplexing the signals provided by the oscillator and the frequency dividers in response to the control signal to provide one signal at a time to the buffer means for amplification and thus to control the frequency of the electromagnetic energy being transmitted into the earth formation.

9. A well logging system as described in claim 8 in which the deriving means includes:

a pair of amplifying means connected to the well logging cable means for amplifying the output signal from the well logging cable means, high pass filter means connected to one amplifier means for passing a high frequency signal from the one amplifier means.

low pass filter means connected to the other amplifier means for passing a low frequency signal from the other amplifier means, a pair of automatic gain control amplifier means, one automatic gain control amplifier means being connected to the high pass filter means while the other automatic gain control amplifier means is connected to the low pass filter means, for amplifying the signals from the high and low pass filter means, a pair of phase lock loop demodulator means, each phase lock loop demodulator means being connected to a corresponding automatic gain control amplifier means for providing a signal at a locked-in frequency, phase means connected to both phase lock loop demodulator means for providing a phase signal related to the phase difference between the received electromagnetic energy of the two receiver coils, a plurality of register means connected to the phase means and to the control signal means for storing a phase signal in accordance with the control signal from the control signal means so that each register means will store a phase signal associated with a corresponding transmitting frequency, and for providing signals corresponding to the stored phase signals, a plurality of phase-to-resistivity converter means, each phase-to-resistivity converter means being connected to a corresponding register means for converting the stored phase different signal to a resistivity signal, and means for providing an indication of the water saturation of the petroleum reservoir in each formation in accordance with the resistivity signals.

10. A system as described in claim 6 in which the transmitting frequencies lie within a preferred range of frequencies from 1 MHz to 100 MHz.

* * * * *